United States Patent
Hummel

(10) Patent No.: US 8,256,548 B2
(45) Date of Patent: Sep. 4, 2012

(54) METHOD FOR REGULATING OR CONTROLLING THE CHARGE STATE OF AN ELECTRICAL ENERGY ACCUMULATOR OF A HYBRID VEHICLE

(75) Inventor: Holger Hummel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/052,753

(22) Filed: Mar. 21, 2011

(65) Prior Publication Data

US 2011/0163727 A1    Jul. 7, 2011

Related U.S. Application Data

(63) Continuation of application No. PCT/EP2009/008050, filed on Nov. 12, 2009.

(30) Foreign Application Priority Data

Dec. 6, 2008    (DE) .......................... 10 2008 060 954

(51) Int. Cl.
| | |
|---|---|
| *B60W 20/00* | (2006.01) |
| *H02J 7/00* | (2006.01) |
| *H02J 7/16* | (2006.01) |
| *H02J 7/04* | (2006.01) |
| *B60K 6/00* | (2006.10) |
| *H02P 7/00* | (2006.01) |
| *H02P 17/00* | (2006.01) |
| *H02G 3/00* | (2006.01) |

(52) U.S. Cl. ...................... 180/65.29; 320/132; 320/137; 320/152; 320/157; 320/162; 180/65.21; 477/7; 477/15; 307/9.1; 307/10.1

(58) Field of Classification Search .................. 320/162, 320/132, 137, 152, 157; 180/65.21; 477/7, 477/15; 307/9.1, 10.1
See application file for complete search history.

(56) References Cited

U.S. PATENT DOCUMENTS

| | | | | |
|---|---|---|---|---|
| 5,818,116 A | * | 10/1998 | Nakae et al. ................. | 290/38 R |
| 5,839,533 A | * | 11/1998 | Mikami et al. ................ | 180/165 |
| 6,232,748 B1 | * | 5/2001 | Kinoshita .................... | 320/132 |

(Continued)

FOREIGN PATENT DOCUMENTS

DE    10 2005 044 828 A1    3/2007

(Continued)

OTHER PUBLICATIONS

German Search Report dated Nov. 25, 2009 including partial English-language translation (Nine (9) pages). International Search Report dated Feb. 26, 2010 including English-language translation (Six (6) pages).

*Primary Examiner* — Drew A Dunn
*Assistant Examiner* — Steve T Chung
(74) *Attorney, Agent, or Firm* — Crowell & Moring LLP

(57) ABSTRACT

A method controls or regulates the charge state of an electrical energy accumulator of a hybrid vehicle, where, in some operating states, the energy accumulator is charged from a low to a higher charge state level by way of an electric machine driven by an internal-combustion engine of the hybrid vehicle and operating as a generator. The level of the charge state to which the energy accumulator is charged by the internal-combustion engine is selected as a function of a parameter representing the load of the electrical system or correlating thereto.

10 Claims, 1 Drawing Sheet

U.S. PATENT DOCUMENTS

| | | | | |
|---|---|---|---|---|
| 6,480,767 | B2* | 11/2002 | Yamaguchi et al. | 701/22 |
| 6,484,833 | B1 | 11/2002 | Chhaya et al. | |
| 6,629,027 | B2* | 9/2003 | Yamaguchi et al. | 701/22 |
| 7,074,157 | B2* | 7/2006 | Wakashiro et al. | 477/7 |
| 7,108,088 | B2* | 9/2006 | Muta | 180/65.235 |
| 7,255,662 | B2* | 8/2007 | Hiroe et al. | 477/3 |
| 7,291,093 | B2* | 11/2007 | Yamamoto et al. | 477/110 |
| 7,328,091 | B2* | 2/2008 | Kimura | 701/22 |
| 7,632,212 | B2* | 12/2009 | Yamanaka et al. | 477/107 |
| 7,657,438 | B2* | 2/2010 | Obayashi et al. | 705/1.1 |
| 2007/0233334 | A1* | 10/2007 | Kozarekar | 701/22 |
| 2007/0247106 | A1* | 10/2007 | Kawahara et al. | 320/104 |
| 2007/0298928 | A1* | 12/2007 | Yamanaka et al. | 477/15 |
| 2008/0218121 | A1 | 9/2008 | Gale et al. | |

FOREIGN PATENT DOCUMENTS

| | | |
|---|---|---|
| DE | 10 2008 008 238 A1 | 8/2008 |
| EP | 1 008 484 A2 | 6/2000 |
| FR | 2 851 516 A1 | 8/2004 |
| GB | 2 406 362 A | 3/2005 |

* cited by examiner

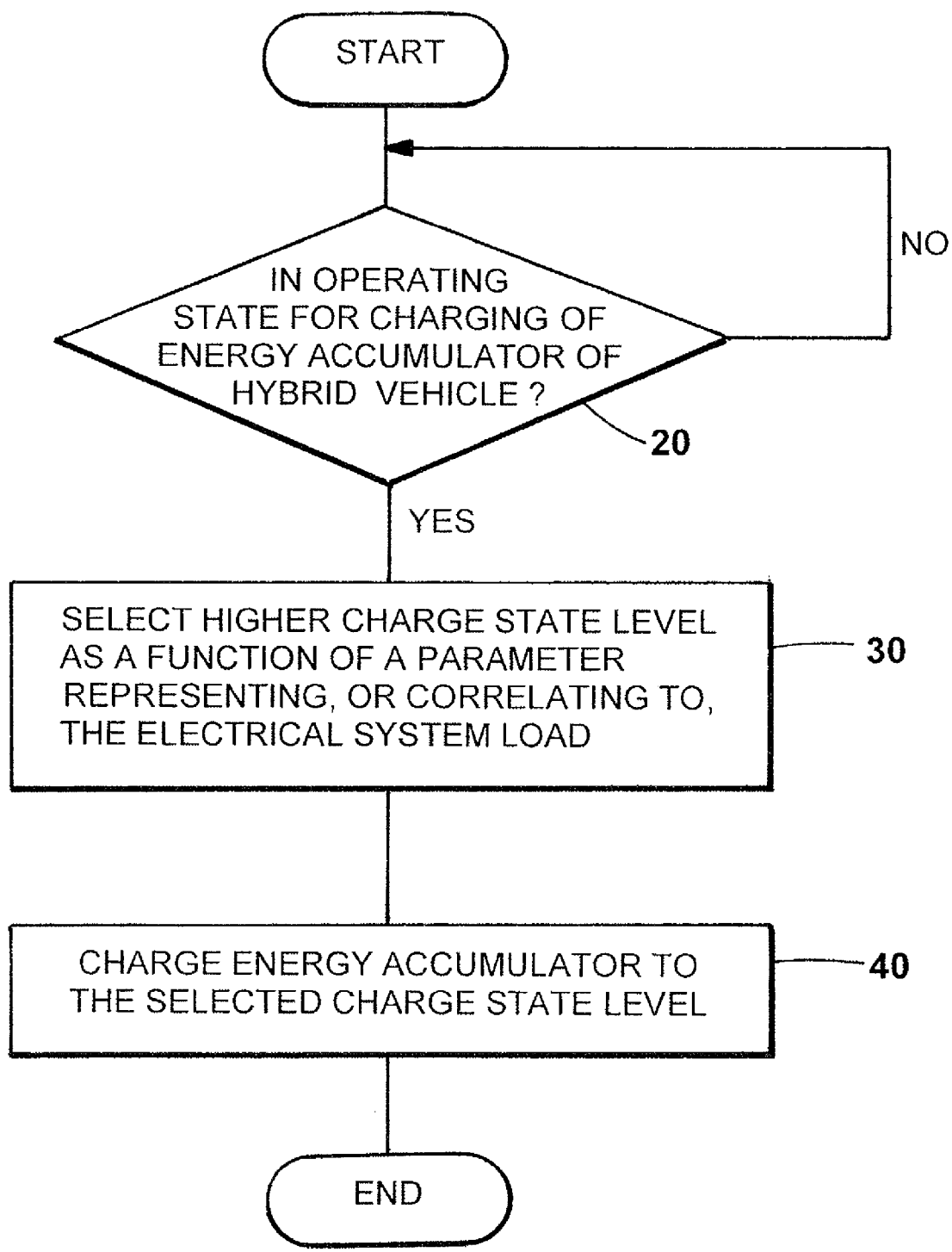

METHOD FOR REGULATING OR CONTROLLING THE CHARGE STATE OF AN ELECTRICAL ENERGY ACCUMULATOR OF A HYBRID VEHICLE

CROSS-REFERENCE TO RELATED APPLICATIONS

This application is a continuation of PCT International Application No. PCT/EP2009/008050, filed Nov. 12, 2009, which claims priority under 35 U.S.C. §119 from German Patent Application No. DE 10 2008 060 954.4, filed Dec. 6, 2008, the entire disclosures of which are herein expressly incorporated by reference.

BACKGROUND AND SUMMARY OF THE INVENTION

The present invention relates to a method for regulating or controlling the charge state of an electrical energy accumulator of a hybrid vehicle.

It is known that hybrid vehicles distinguish themselves by the combination of an internal-combustion engine and at least one electric machine. In the case of a so-called "full hybrid", the vehicle can optionally be driven by only the internal-combustion engine, by only the electric motor, or by the internal-combustion engine assisted by the electric motor. In the case of a so-called "mild hybrid", the electric machine is provided only for assisting the internal-combustion engine as well as for recuperating kinetic energy of the vehicle during coasting phases. Purely electric driving is not possible in the case of a mild hybrid.

Some hybrid concepts also have a so-called engine start/stop function. When the vehicle is stationary, for example, in a traffic jam or in front of a red traffic light, the automatic start/stop system will automatically switch off the internal-combustion engine. If a large amount of electric power is withdrawn from the battery, when the vehicle is stationary, for example, by an electrically driven compressor of the vehicle air-conditioning system, this could lead to a rapid lowering of the charge state of the battery. In order to prevent the charge state from falling into a critical range, in which there would be the risk that certain vehicle functions may fail, the battery has to be charged in time by use of the internal-combustion engine; i.e., when the vehicle is stationary, the internal-combustion engine has to be started additionally, if required; or, when the internal-combustion engine is already running, the load point has to be raised correspondingly. For conventional hybrid concepts, it is provided in this case that the battery is charged to a certain, precisely predefined upper charge state value.

If the charge state to which the energy accumulator is charged by way of the internal-combustion engine is selected to be too low, this may result in a frequent switching-on and off of the internal-combustion engine when the electrical system load is high. If, in contrast, the charge state to which the energy accumulator is charged by way of the internal-combustion engine is selected to be relatively high, it may take a very long time before the battery is charged to the corresponding level and the internal-combustion engine can be switched off again, which is undesirable particularly in traffic jam phases in which traffic comes to frequent standstills and the driver would not expect an automatic switching-off of the internal-combustion engine.

It is an object of the invention to provide a method for controlling or regulating the charge state of an electrical energy accumulator of a hybrid vehicle, where the charging of the energy accumulator takes place as much as possible according to the requirements.

This and other objects are achieved by a method for controlling or regulating the charge state of an electrical energy accumulator of a hybrid vehicle, where, in some operating states, the energy accumulator is charged from a low to a higher charge state level by way of an electric machine driven by an internal-combustion engine of the hybrid vehicle and operating as a generator. The level of the charge state to which the energy accumulator is charged by way of the internal-combustion engine is selected as a function of a parameter representing the load of the electrical system or correlating thereto.

Other objects, advantages and novel features of the present invention will become apparent from the following detailed description of one or more preferred embodiments when considered in conjunction with the accompanying drawings.

BRIEF DESCRIPTION OF THE DRAWING

The sole FIGURE is a flowchart illustrating an exemplary method for controlling or regulating the charge state of an electrical energy accumulator of a hybrid vehicle according to the invention.

DETAILED DESCRIPTION OF THE DRAWING

Referring to the FIGURE, a method is provided for controlling or regulating the charge state of an electrical energy accumulator of a hybrid vehicle, where the energy accumulator may be a battery or, as an alternative, a capacitor arrangement by way of which an electric machine operating as a generator and driven by the internal-combustion engine of the hybrid vehicle is charged in some operating states, from a lower to a higher charge state (step 20). In accordance with the invention, the level of the charge state to which the energy accumulator is charged by way of the internal-combustion engine is not precisely predefined, but rather is selected as a function of a "parameter" representing the load of the electrical system or correlating thereto (step 30). As used herein, the term "parameter" should be interpreted in a broad fashion. It does not necessarily have to be an individual parameter. On the contrary, it may be provided that the level of the charge state to which the energy accumulator is charged (step 40) by way of the internal-combustion engine is selected as a function of several parameters.

Likewise, the term "electrical system load" is to be interpreted broadly. The electric power withdrawn from the energy accumulator and determined from the voltage and the current can be considered to be the "electrical system load". In a simplifying manner, only one "current value" can also be used.

The charge state level, which when reached terminates the charging of the energy accumulator by the internal-combustion engine, or which when reached in standstill phases of the vehicle switches off the internal-combustion engine again, can be determined particularly as a function of the "high-voltage-side" electrical system load. As a result of a "defining of the charge state level ("SOC" or "state of charge") according to the requirement" as a function of the actual electrical system load, a frequent switching-on and switching-off of the internal-combustion engine as well as charging operations that are too long can be avoided.

According to a further aspect of the invention, it is provided that the level of the charge state to which the energy accumulator is charged by way of the internal-combustion engine depends on the instantaneous electrical system load (actual electrical system load) and/or on the amount of energy withdrawn from the energy accumulator during a previous phase or on the time-related integral of the electrical system load.

If not only the instantaneous electrical system load is considered, but also the progression of the electrical system load from a point-in-time in the past to the instantaneous electrical system load, it may be provided that, instead of the time-related integral of the electrical system load, a "filtered electrical system load" or an "average electrical system load" is used and, as a function thereof, the level of the charge state is selected to which the energy accumulator is charged by means of the internal-combustion engine.

It may be provided that the energy accumulator is charged by way of the internal-combustion engine when the charge state of the energy accumulator falls to or below the pre-defined charge state. The level as of which a charging of the energy accumulator by means of the internal-combustion engine takes place may be defined, for example, at 35% of the maximal charge state of the electrical energy accumulator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling or regulating a charge state of an electrical energy accumulator of a hybrid vehicle, the method comprising the acts of:
   selecting a higher charge state level to which the electrical energy accumulator is to be charged as a function of, or correlating thereto, an operating state of the hybrid vehicle and a parameter representing a load of an electrical system of the hybrid vehicle; and
   charging the electrical energy accumulator from a low charge state level to the selected higher charge state level via an electric machine operating as a generator and driven by an internal-combustion engine of the hybrid vehicle.

2. The method according to claim 1, wherein the parameter representing or correlating to the electrical system load is an instantaneous electrical system load or is a function of the instantaneous electrical system load.

3. The method according to claim 1, wherein the parameter representing or correlating to the electrical system load is a function of the electrical system load existing during a past phase of operation of the hybrid vehicle.

4. The method according to claim 2, wherein the parameter representing or correlating to the electrical system load is a function of the electrical system load existing during a past phase of operation of the hybrid vehicle.

5. The method according to claim 1, further comprising the acts of:
   forming an average or filtered electrical system load from a progression of the electrical system load during a past phase; and
   using the average or filtered electrical system load in determining the charge state level to which the energy accumulator is charged by the internal-combustion engine.

6. The method according to claim 2, further comprising the acts of:
   forming an average or filtered electrical system load from a progression of the electrical system load during a past phase; and
   using the average or filtered electrical system load in determining the charge state level to which the energy accumulator is charged by the internal-combustion engine.

7. The method according to claim 3, further comprising the acts of:
   forming an average or filtered electrical system load from a progression of the electrical system load during a past phase; and
   using the average or filtered electrical system load in determining the charge state level to which the energy accumulator is charged by the internal-combustion engine.

8. The method according to claim 1, further comprising the act of:
   charging the energy accumulator by way of the internal-combustion engine when an instantaneous charge state level of the energy accumulator falls to or below a predefined charge state level.

9. The method according to claim 8, wherein the predefined charge state level is in a range of about 30% to 40% of a maximal charge state level.

10. The method according to claim 8, wherein the predefined charge state level is approximately 35% of a maximal charge state level.

* * * * *